United States Patent
Hoga et al.

(10) Patent No.: US 6,384,120 B1
(45) Date of Patent: May 7, 2002

(54) SYNTHETIC RESIN FILM FOR AGRICULTURAL USE EXCELLENT IN ANTIFOG AND ANTIMIST PROPERTIES

(75) Inventors: Takuya Hoga, Saitama; Hiroshi Ohsawa; Masaki Nakamura, both of Shizuoka, all of (JP)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/214,752

(22) PCT Filed: Apr. 27, 1998

(86) PCT No.: PCT/JP98/01928

§ 371 Date: Sep. 14, 1999

§ 102(e) Date: Sep. 14, 1999

(87) PCT Pub. No.: WO98/51745

PCT Pub. Date: Nov. 19, 1998

(30) Foreign Application Priority Data

May 12, 1997 (JP) .............................. 9-121232

(51) Int. Cl.[7] .............................. C08L 91/06; C08K 5/10
(52) U.S. Cl. .................... 524/278; 524/111; 524/275; 524/276; 524/277
(58) Field of Search ................ 524/275, 276, 524/277, 278, 110, 111

(56) References Cited

U.S. PATENT DOCUMENTS

| | | | | |
|---|---|---|---|---|
| 3,125,547 A | * | 3/1964 | Blatz et al. .................. | 525/199 |
| 4,113,679 A | * | 9/1978 | Andrascheck et al. ......... | 526/4 |
| 4,829,116 A | * | 5/1989 | Piesold ....................... | 524/278 |
| 5,085,933 A | * | 2/1992 | Katoh et al. ................. | 428/332 |
| 5,147,707 A | * | 9/1992 | Hasegawa et al. ........... | 428/212 |
| 5,268,704 A | * | 12/1993 | Hasegawa et al. ........... | 346/1.1 |
| 5,324,785 A | * | 6/1994 | Noda et al. .................. | 525/276 |
| 5,416,152 A | * | 5/1995 | Fleischer et al. ........... | 524/487 |
| 5,422,061 A | * | 6/1995 | Takahashi et al. .......... | 264/571 |
| 5,446,086 A | * | 8/1995 | Sugiyama et al. .......... | 524/542 |

OTHER PUBLICATIONS

English Translation of Abstract of Japanese Publication 04-272946.
English Translation of Abstract of Japanese Publication 60-096682.
English Translation of Abstract of Japanese Publication 02-279733.
English Translation of Abstract of Japanese Patent 57014648.

* cited by examiner

Primary Examiner—Judy M. Reddick
(74) Attorney, Agent, or Firm—Anthony A. Bisulca

(57) ABSTRACT

A synthetic resin film for agriculture suited as a covering material for greenhouses or the like, which shows good anti-clouding and anti-fogging properties immediately after being spread and for longer period than 2 years. The synthetic resin film for agriculture is obtained by using (a) an ester of sorbitan with a higher fatty acid mainly containing 24 to 34 carbon atoms (montanic acid wax), an ester of glycerin with montanic acid wax and/or alkylene oxide adducts thereto and/or an ester of polyoxyalkylene with montanic acid wax as an anti-clouding agent, and (b) a fluorine-containing surfactant as an anti-fogging agent, kneading them with a film-forming resin such as vinyl chloride resin, polyethylene, ethylene/vinyl acetate copolymer, and forming it into a film. Incorporation of (c) an ester of sorbitan with higher fatty acid containing 12 to 22 carbon atoms, an ester of glycerin with higher fatty acid containing 12 to 22 carbon atoms or an alkylene oxide adduct thereto may further improve the anti-clouding property.

7 Claims, No Drawings

SYNTHETIC RESIN FILM FOR AGRICULTURAL USE EXCELLENT IN ANTIFOG AND ANTIMIST PROPERTIES

FIELD OF THE INVENTION

This invention relates to a synthetic resin film for agriculture and, more particularly, to a synthetic resin film for agriculture having good long-lasting transparency and anti-clouding and anti-fogging properties which is suited for use as a covering material for greenhouses or the like.

BACKGROUND OF THE INVENTION

Accelerated, semi-accelerated or retarding culture has conventionally been popularly conducted for the purpose of raising productivity or marketability of agricultural products. These cultures has been carried out in greenhouses or tunnels using covering materials such as vinyl chloride resin, polyethylene or ethylene/vinyl acetate copolymer resin. In the culture using greenhouses or tunnels, the greenhouses or tunnels are tightly closed by the covering material. The water vapor which is transpired from the soil and plants is, therefore, not discharged, the atmosphere within greenhouses or tunnels is saturated with the water vapor, and the water vapor condenses to form droplets of water on the inner surface of a cold film. Water droplets on the film not only seriously reduce the amount of incident sunlight due to irregular reflection but the droplets fall on the plants resulting in occurrence of diseases. To avoid formation of water droplets on the inner surface of the covering material film to thereby increase the amount of incident sunlight and, even if water droplets are formed on the inner surface of the film, to allow the droplets to flow downward along the inner surface of the film, it has widely been conducted to coat an anti-clouding agent on the inner surface of the film or to incorporate the anti-clouding agent in the film itself. However, in the case of using the anti-clouding agent, generation of fog which is liable to occur within the greenhouses or tunnels due to rapid change of the outside temperature is more promoted resulting in frequent generation of fog. When fog is generated within the greenhouses or tunnels, stems, leaves, flowers, fruits, etc. of cultivated plants get wet, which can cause occurrence or propagation of plant diseases. Thus, it has been conducted to use a anti-fogging agent together with the anti-clouding agent.

In order to prevent or reduce fog generation to be caused by the synthetic resin film for agriculture, various anti-clouding agents and anti-fogging agents are known. For example, Japanese Examined Patent Publication No. S59-35573 describes synthetic resin-made covering materials for agriculture having incorporated therein a fluorine-containing surfactant as an anti-fogging agent and other nonionic surfactant as an anti-clouding agent. In this publication, esters of higher fatty acids such as stearic acid with alcohols such as sorbitan, glycerin, polyethylene glycol, trimethylolpropane or pentaerythritol are described as the nonionic surfactants. However, the higher fatty acid ester compounds or the fluorine-containing surfactants specifically described in the publication difficultly provide enough lasting efficiency to the covering materials when previously incorporated as the anti-clouding agent or anti-fogging agent. According to the evaluation of the covering materials by accelerated test, there is obtained durability of only 4 to 7 months.

Japanese Unexamined Patent Publication No. H4-272946 describes to incorporate a fluorine-containing compound, a nonionic surfactant and a hindered amine compound in polyolefin resin to thereby retain anti-clouding property and anti-fogging property for a longer period of time. However, actual exposure tests on anti-clouding property conducted under similar conditions to that described in the publication have revealed that the anti-clouding property lasts for only 60 days at the longest both at a lower temperature and at a normal temperature. Also, actual exposure tests on anti-fogging property conducted under the conditions described in the publication revealed that anti-fogging property lasts for about 7 months after spreading. Thus, the polyolefin resin films are not said to have satisfactorily long-lasting effects.

On the other hand, as a method for attaining long-lasting anti-clouding property or anti-fogging property, Japanese Unexamined Patent Publication Nos. S60-96682 and H2-279733, etc. describe a so-called coating method of coating a composition having anti-clouding property or both anti-clouding property and anti-fogging property on agricultural film. This coating method can impart good long-lasting anti-clouding property and anti-fogging property to synthetic resin film for agriculture based on electrostatic mutual action between inorganic fine powder of hydrotalcite or the like incorporated in the base film and an effective ingredient such as inorganic hydrophilic colloid contained in the coating composition. It is necessary, however, to spray-coat or roller-coat the composition after spreading the agricultural films. In spray-coating, a lot of coating solution is used with such a low efficiency that spray-coating method has the defects that, in comparison with incorporating method, it is economically disadvantageous, it requires a long coating time, and causes coating unevenness which can deteriorate the anti-dripping effect. The same applies to the roller-coating method.

An object of the present invention is to provide a synthetic resin film for agriculture having good transparency, good anti-clouding property, good anti-fogging property and long lasting effect thereof, which can be obtained by a conventional incorporation process with excellent cost advantages, handling easiness, workability and uniformity in performance.

DISCLOSURE OF THE INVENTION

As a result of intensive investigations, the inventors have found that a synthetic resin film for agriculture can be obtained by previously kneading an anti-clouding agent and an anti-fogging agent into a resin, by which the film exhibits anti-clouding and anti-fogging properties for a duration as long as, or longer than, that attained by the coating method, using a specific higher fatty acid ester as anti-clouding agent and a fluorine-containing surfactant as anti-fogging agent, thus having achieved the present invention.

That is, the present invention is a synthetic resin film for agriculture which contains kneaded therein (a) at least one compound selected from the group consisting of (1) an ester of sorbitan with acid wax derived from montan wax, i.e., higher fatty acid mainly containing 24 to 34 carbon atoms (montanic acid wax), (2) an ester of glycerin with montanic acid wax, (3) an alkylene oxide adduct to the ester of sorbitan with montanic acid wax, (4) an alkylene oxide adduct to the ester of glycerin with montanic acid wax, and (5) an ester of polyoxyalkylene with montanic acid wax and (b) a fluorine-containing surfactant.

In the present invention, (c) at least one compound selected from the group consisting of esters of sorbitan with higher fatty acids containing 12 to 22 carbon atoms, esters of glycerin with higher fatty acids containing 12 to 22 carbon atoms, and alkylene oxide adducts thereto may further be incorporated in addition to the above-described ingredients (a) and (b) for more improving the anti-clouding and anti-fogging properties of the film.

As is described above, the fatty acid constituting component (a) is required to be montanic. acid wax containing higher fatty acids having 24 to 34 carbon atoms as a major component. The montanic acid wax is a natural mineral wax usually extracted and purified from brown coal, and has the longest carbon chain of the industrially available higher fatty acids. In the present invention, the number of carbon atoms of the fatty acid is limited to 24 to 34 because, if the number of carbon atom of the fatty acid used as a major component is 22 or less, long-lasting anti-clouding property, which is intended in the present invention, can not be attained, whereas higher fatty acids containing more than 34 carbon atoms are difficult to be industrially available. Further, in the present invention, the ester products of montanic acid wax (hereinafter referred to as "montanic acid wax esters") are not limited to monoesters but may be diesters, triesters, etc.

On the other hand, the mol number of added alkylene oxide in the alkylene oxide adduct of component (a) is preferably 1 to 50 mols per molecule, more preferably 1 to 30 mols, most preferably 5 to 20 mols. In the present invention, a plurality of compounds having different mol number of added alkylene oxide are properly combined to obtain preferable results. In such cases, it is preferred to use in combination 2 to 3 kinds of those having a larger mol number of added alkylene oxide, those having a middle mol number, and those having a smaller mol number. Because, such combination provides proper balance between hydrophobicity based on longer chain alkyl group and hydrophilicity based on polyalkylene oxide group, thus migration of the anti-clouding agent to the film surface and wetting properties with water being suitably adjusted and long-lasting effects being obtained as well as good initial properties. As an example of using a plurality of adducts, there are illustrated mixtures of an adduct having 20 mols of added alkylene oxide, an adduct having 10 mols of added alkylene oxide and an adduct having 5 mols of added alkylene oxide. Of these mixtures, two or three adducts may be selected to use in combination. In the case of using a plurality of alkylene oxide adducts, mixing ratio is not particularly limited, and may properly be decided. As a general guide, however, when an adauct having a larger mol number of added alkylene oxide, an adduct having a middle mol number of added alkylene oxide and an adduct having a smaller mol number of added alkylene oxide are used in combination, they may usually be used in the same quantity.

Component (a) is incorporated in a total amount of 0.3 to 3 parts by weight per 100 parts by weight of the synthetic resin, more preferably 0.5 to 2 parts by weight.

Examples of the montanic acid esters or alkylene oxide adducts thereto to be used as component (a) should include the compounds represented by the following formulae (1) to (5):

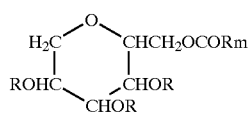

sorbitan mono-, di- or trimontanate

 (2)

polyoxyalkylene glycol montanate

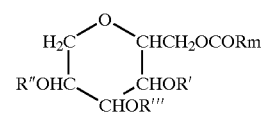

polyalkylene oxide adduct of sorbitan mono-, di- or trimontanate

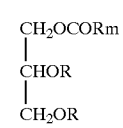

glycerin mono-, di- or trimontanate

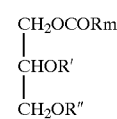

polyalkylene oxide adduct of glycerin mono-, di- or trimontanate

In the above formulae, Rm represents an alkyl group mainly derived from $C_{23}$ to $C_{33}$ montanic acid, R represents RmCO— or H, R' represents RmCO—, H or (—Alk—O—)$_{n1}$H, R" represents RmCO—, H or (—Alk—O—)$_{n2}$H, R'" represents RmCO— or (—Alk—O—)$_{n3}$H, Alk represents $(CH_2)_n$ (wherein n represents 2 or 4) or a propylene group, and N and n1+n2+n3 each represents an integer of 50 or less, with N, n1, n2 and n3 being an integer of 1 or more.

Of the montanic acid wax esters or alkylene oxide adducts thereof to be used as component (a), preferred compounds are: sorbitan montanate containing montanic acid wax monoester as a major component and an ethylene, propylene or butylene oxide adduct thereof; glycerin montanate containing montanic acid wax monoester as a major component and an ethylene, propylene or butylene oxide adduct thereof; polyethylene glycol, polypropylene glycol or polybutylene glycol ester of montanic acid wax; etc. Among these compounds, an ethylene oxide adduct of sorbitan montanate containing montanic acid wax monoester as a major component, an ethylene oxide adduct of glycerin montanate containing montanic acid wax monoester, and an ethylene oxide adduct of montanic acid are particularly preferred.

On the other hand, as the component (c) of fluorine-containing surfactant to be added as anti-fogging agent, any of anionic, cationic, amphoteric and nonionic compounds may be used. Typical examples of the fluorine-containing surfactant to be used in the present invention are illustrated below.

(I) Anionic Fluorine-containing Surfactants
  (1) —COOM type
    $RfSO_2NR'CH_2COOM$
  (2) —OSO$_3$M type
    RfBNR'YOSO$_3$M
  (3) —SO$_3$M type
    RfSO$_3$M
    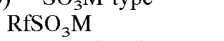
  (4) —OPO(OM)$_2$ type
    RfBNR'YOPO(OM)$_2$ In the above formulae, Rf represents a fluoroalkyl group wherein all or part of hydrogen atoms in the alkyl moiety are substituted by fluorine atoms, B represents —CO— or —SO$_2$—, R' represents a hydrogen atom or a lower alkyl group, Y represents a C$_{2-6}$ alkyl group, and M represents a hydrogen atom, —NH$_4$, an alkali metal or an alkaline earth metal.

(II) Cationic Fluorine-containing Surfactants
(1) —NR'R''·HX type
RfBNHYNR'R''·HX
(2) —N$^+$R'R''R'''·X$^-$type
RfBNHYN$^+$R'R''R'''·X$^-$ In the above formulae, Rf, B, R' and Y are the same as defined hereinbefore, R'' and R''' each represents a hydrogen atom or a lower alkyl group, HX represents an acid, and X represents a halogen atom or an acid radical.

(III) Amphoteric Fluorine-containing Surfactants
(1) —N$^+$(R')$_2$——COO$^-$type
RfBNHYN$^+$(R')$_2$Y'COO$^-$ In the above formula, Rf, B, Y and R' are the same as defined hereinbefore, and Y' represents a C$_{1-30}$ alkylene group.

(IV) Nonionic Fluorine-containing Surfactants
(1) alcohol type
RfOH
(2) ether type
RfYO (Y'O)$_n$M In the above formulae, Rf, Y, Y' and M are the same as defined hereinbefore, and n represents an integer of 1 to 50.

Of the above-illustrated fluorine-containing surfactants, preferable ones are shown below, some of them being used in Examples and Comparative Examples.

(i) RfSO$_3$K (wherein Rf represents a C$_{8-12}$ perfluoroalkyl group) e.g., Fulorad FC-95 (manufactured by Sumitomo 3M K.K.) Fulorad FC-98 (manufactured by Sumitomo 3M K.K.)

(ii) RfCONH (CH$_2$CH$_2$)$_n$N$^+$(CH$_3$)$_3$·I$^-$ e.g., Fulorad FC-135 (manufactured by Sumitomo 3M K.K.)

(iii) RfCONHCH$_2$CH$_2$N$^+$(CH$_3$)$_2$ (CH$_2$CH$_2$)$_4$COO$^-$ (iv) Rf(CH$_2$CH$_2$O)$_n$H (wherein n=5 to 50) e.g., Fulorad FC-170C (manufactured by Sumitomo 3M K.K.) Fluowet OTN (manufactured by Hoechst AG)

These fluorine-containing surfactants are incorporated preferably in an amount of 0.05 to 2 parts by weight per 100 parts by weight of the synthetic resin, more preferably 0.1 to 0.5 part by weight. If the amount is less than 0.05 part by weight, there can result in insufficient anti-fogging effect whereas, if more than 2 parts by weight, there results in whitened films or bleed-out phenomenon leading to sticky surface to which dusts are liable to adhere. The fluorine-containing surfactants may be used alone or as a mixture of two or more.

In the present invention, the combined use of component (a) of the ester or its alkylene oxide adduct and component (b) of fluorine-containing surfactant provides good anti-clouding property and anti-fogging property, which can last for a long period of time. However, when a conventionally known anti-clouding agent is used in place of the component (a), long-lasting anti-clouding property can not be obtained whereas, when the component (b) of fluorine-containing surfactant is not used, sufficient anti-fogging effect can not be obtained. Further, the anti-clouding effect attained mainly by the component (a) is synergistically enhanced by the combined use with the fluorine-containing surfactant and, reversely, the anti-fogging effect attained only by the fluorine-containing surfactant is more enhanced by the combined use with the component (a) of the ester or its alkylene oxide adduct. These have been experimentally demonstrated.

As the component (c) of esters of sorbitan with higher fatty acids containing 12 to 22 carbon atoms, esters of glycerin with higher fatty acids containing 12 to 22 carbon atoms, or the alkylene oxide adducts thereof to be optionally used in addition to the components (a) and (b) described above, there are illustrated, for example, sorbitan compounds such as sorbitan monolaurate, sorbitan monopalmitate, sorbitan monostearate, sorbitan monooleate, and polyalkylene oxide adducts thereof; and glycerin compounds such as glycerin monolaurate, glycerin monopalmitate, glycerin monostearate, glycerin monooleate, and the polyoxyethylene adducts thereof.

Addition of the component (c) serves more to improve the initial anti-clouding property and durability of the anti-clouding and anti-fogging effects. This improvement is remarkable when the component (c) is used in combination with the esters of montanic acid having a lower mol number of added alkylene oxide. Component (c) is used preferably in an amount of 0.3 to 3 parts by weight as a sum of component (a) and component (c), more preferably 0.5 to 2 parts by weight. As to the amount of the component (c) alone, it is used usually in an amount of 0.1 to 1 part by weight, preferably 0.2 to 0.7 part by weight, together with the montanic acid derivatives.

As the resin for the synthetic resin film for agriculture suitably used for the agricultural covering material of the present invention, any of those that have conventionally been used for such use may be used. As typical examples, there are illustrated vinyl chloride type resins such as polyvinyl chloride; ethylenic resins such as polyethylene and ethylene/vinyl acetate copolymer; and propylene resins. Of these, vinyl chloride type resins and ethylenic resins are preferred. However, the synthetic resins to be used in the present invention are not limited to these resins.

In the synthetic resin film for agriculture of the present invention may be incorporated commonly used various additives for resins such as lubricant, antistatic agent, weatherproof-improving agents (ultraviolet ray absorbing agent, hindered amine light stabilizer, etc.), plasticizer, anti-oxidant (including heat stabilizer), dye and pigment in amounts usually employed. The effects of the present invention are neither spoiled by them, nor are damaged respective functions of the various resin additives.

The synthetic resin film of the present invention may be produced according to known processes such as an extrusion process (T-die extrusion process, inflation molding process, etc.), calender roller molding process, etc. The film thickness is adjusted preferably to 50 to 300 μm.

BEST MODE FOR PRACTICING THE INVENTION

The present invention will be described in more detail by reference to Examples which, however, are not construed to be limitative at all.

EXAMPLE 1

1.5 parts by weight of an adduct of sorbitan monomontanate (monoester of sorbitan with montanic acid wax) with 5 mols of ethylene oxide and 0.3 part by weight of an adduct of perfluoroethanol (RfCH$_2$CH$_2$OH; Rf=C$_{6-12}$) with ethylene oxide (nonionic fluorine-containing surfactant, F-1) were added to 100 parts by weight of an ethylene/vinyl acetate copolymer (content of vinyl acetate: 14%; Evaflex P-1403) and kneaded in a biaxial extruder, then formed into a 100-μm thick film using an inflation film molding machine. This film was spread on a framed slant ceiling surface of an experimental greenhouse constructed outside by which a thermostatic water vessel was covered to observe the state of deposition of water droplets onto the inner surface of the film and the state of fog generation in the vicinity of the inner surface. Accelerated test, and observation and evaluation of the anti-clouding property and anti-fogging property were conducted in the following manner to obtain the results tabulated in Table 2.

[Method of accelerated test]

A film sample formed from a resin having incorporated therein an anti-clouding agent and a anti-fogging agent was fixed to a frame, and was subjected to the cycle of immersing in a 60° C. water bath for one week and placing in a 60° C. oven for one week alternatively for a total period of 45 days or 90 days. Then, the film sample was set to the slant ceiling surface of the aforesaid experimental greenhouse to visually observe deposition of water droplets on the inner surface of the film and state of fog generation in the vicinity of the inner surface of the film. In this accelerated test, 45-day test and 90-day test respectively correspond to about one year and 2 years according to the rule that a 10° C. increase in temperature twice accelerates aging of the film.

[Method for observing and evaluating anti-clouding property and anti-fogging property]

The state of deposition of water droplets and the state of fog generation were observed by eyes with adjusting the water vessel temperature to 40° C. in the morning or evening when temperature was lowered. This observation by eyes was continued for 3 days. The water vessel was left alone except when the observation of fog generation was conducted.

The evaluation of the anti-clouding property and generation of fog was made under the following criteria. Deposition of water droplets:

⊚. . . No water droplets deposited on the inner surface of the film, and almost no clouding was observed.

⊚/○. . . A slight amount of water droplets deposited, but almost no clouding was observed.

○. . . A slight amount of water droplets deposited, and clouding was observed.

Δ. . . Large water droplets were deposited, and clouding was observed.

×. . . A considerable amount of small water droplet deposited, and clouding was observed considerably.

Generation of Fog:

⊚. . . Generation of fog was scarcely observed.

○. . . Generation of fog was slightly observed.

Δ. . . Generation of fog was clearly observed.

×. . . Generation of fog was seriously observed.

EXAMPLES 2 to 29, and 32 to 37

Synthetic resin films were prepared in the same manner as in Example 1 except for replacing 1.5 parts by weight of the adduct of sorbitan monomontanate with 5 mols of ethylene oxide and 0.3 part by weight of the adduct of perfluoroethanol (RfCH$_2$CH$_2$OH; Rf=C$_{6-12}$) with ethylene oxide by respective compounds described in Table 1 in amounts also described in Table 1. Evaluation of the films was conducted according to the same accelerated test method and observation and evaluation method of anti-clouding property and anti-fogging property as in Example 1 to obtain results shown in Table 2.

Additionally, in the column of component (a) or (c) in the following table, "RmSb" represents sorbitan monomontanate,"RmSb EO 1 mol","RmSb EO 5 mols", "RmSb EO 10 mols", "RmSb EO 20 mols", "RmSb EO 30 mols" and "RmSb EO 50 mols" each represents an adduct of sorbitan monomontanate with 1 mol, 5 mols, 10 mols, 20 mols, 30 mols or 50 mols of ethylene oxide, "Rm2Sb EO 5 mols", "Rm2Sb EO 10 mols" and "Rm2Sb EO 20 mols" each represents an adduct of sorbitan dimontanate with 5 mols, 10 mols or 20 mols of ethylene oxide, "Rm3Sb EO 5 mols", T"Rm3Sb EO 10 mols" and "Rm3Sb EO 20 mols" each represents an adduct of sorbitan trimontanate with 5 mols, 10 mols or 20 mols of ethylene oxide; "RmGly" represents glycerin monomontanate, "Rm3Gly" represents glycerin trimontanate, "RmGly EO 1 mol", "RmGly EO 5 mols", "RmGly EO 10 mols", "RmGly EO 20 mols", "RmGly EO 30 mols" and "RmGly EO 50 mols" each represents an adduct of glycerin monomontanate with 1 mol, 5 mols, 10 mols, 20 mols, 30 mols or 50 mols of ethylene oxide, "Rm2Gly EO 5 mols", "Rm2Gly EO 10 mols" and "Rm2Gly EO 20 mols" each represents an adduct of glycerin dimontanate with 5 mols, 10 mols or 20 mols of ethylene oxide; "RmEO 5 mols", "RmEO 20 mols" and "RmEO 50 mols" each represents an adduct of montanic acid with 5 mols, 20 mols or 50 mols of ethylene oxide.

In the column of component (b),"F-2" represents an anionic, fluorine-containing surfactant of RfCOOK (wherein Rf represents a C$_{8-12}$ fluoroalkyl group),"F-3" represents a cationic, fluorine-containing surfactant of RfCONH(CH$_2$CH$_2$)$_n$N$^+$(CH$_3$)$_3$ · I$^-$(wherein Rf represents a C$_{8-12}$ fluoroalkyl group, and n represents 1 to 3).

"phr" in the table represents parts by weight per 100 parts by weight of resin.

EXAMPLE 30

Procedures described in Example 1 were conducted except for using, as components (a) and (c), 0.5 part by weight of an adduct of sorbitan monomontanate with 5 mols of ethylene oxide, 0.5 part by weight of an adduct of sorbitan monomontanate with 10 mols of ethylene oxide and 0.5 mol part of an adduct of sorbitan monostearate with ethylene oxide (StSb EO$_n$) in place of 1.5 parts by weight of the adduct of sorbitan monomontanate with 5 mols of ethylene oxide used in Example 1. Evaluation of the film was conducted according to the same accelerated test method and observation and evaluation method of anti-clouding property and anti-fogging property as in Example 1 to obtain the results shown in Table 2.

EXAMPLE 31

Procedures described in Example 1 were conducted except for using, as components (a) and (c), 0.5 part by weight of an adduct of sorbitan monomontanate with 5 mols of ethylene oxide, 0.5 part by weight of an adduct of sorbitan monomontanate with 10 mols of ethylene oxide and 0.5 part by weight of an adduct of sorbitan monolaurate with ethylene oxide (LaSb EOn) in place of 1.5 parts by weight of the adduct of sorbitan monomontanate with 5 mols of ethylene oxide used in Example 1. Evaluation of the film was conducted according to the same accelerated test method and observation and evaluation method of anti-clouding property and anti-fogging property as in Example 1 to obtain the results shown in Table 2.

TABLE 1

| Example No. | component (a) or (c) first component | second component | third component | additive amount (phr) first component | second component | third component | component (b) fluorine-containing SAA | additive amount (phr) |
|---|---|---|---|---|---|---|---|---|
| 1 | RmSb EO 5 mol | — | — | 1.50 | 0.00 | 0.0 | F-1 | 0.30 |
| 2 | RmSb EO 10 mol | — | — | 1.50 | 0.00 | 0.0 | F-1 | 0.30 |
| 3 | RmSb EO 20 mol | — | — | 1.50 | 0.00 | 0.0 | F-1 | 0.30 |
| 4 | RmSb EO 5 mol | RmSb EO 10 mol | — | 0.75 | 0.75 | 0.0 | F-2 | 0.30 |
| 5 | RmSb EO 5 mol | RmSb EO 20 mol | — | 0.75 | 0.75 | 0.0 | F-2 | 0.30 |
| 6 | RmSb EO 10 mol | RmSb EO 20 mol | — | 0.75 | 0.75 | 0.0 | F-2 | 0.30 |
| 7 | RmSb EO 5 mol | RmSb EO 10 mol | RmSb EO 20 mol | 0.50 | 0.50 | 0.5 | F-1 | 0.30 |
| 8 | RmSb EO 1 mol | RmSb EO 20 mol | RmSb EO 50 mol | 0.50 | 0.50 | 0.5 | F-1 | 0.30 |
| 9 | RmSb EO 1 mol | RmSb EO 10 mol | RmSb EO 30 mol | 0.50 | 0.50 | 0.5 | F-1 | 0.30 |
| 10 | RmGly EO 5 mol | — | — | 1.50 | 0.00 | 0.0 | F-1 | 0.30 |
| 11 | RmGly EO 10 mol | — | — | 1.50 | 0.00 | 0.0 | F-1 | 0.30 |
| 12 | RmGly EO 20 mol | — | — | 1.50 | 0.00 | 0.0 | F-1 | 0.30 |
| 13 | RmGly EO 5 mol | RmGly EO 10 mol | — | 0.75 | 0.75 | 0.0 | F-2 | 0.30 |
| 14 | RmGly EO 5 mol | RmGly EO 20 mol | — | 0.75 | 0.75 | 0.0 | F-2 | 0.30 |
| 15 | RmGly EO 10 mol | RmGly EO 20 mol | — | 0.75 | 0.75 | 0.0 | F-2 | 0.30 |
| 16 | RmGly EO 5 mol | RmGly EO 10 mol | RmGly EO 20 mol | 0.50 | 0.50 | 0.5 | F-1 | 0.30 |
| 17 | RmGly EO 1 mol | RmGly EO 20 mol | RmGly EO 50 mol | 0.50 | 0.50 | 0.5 | F-1 | 0.30 |
| 18 | RmGly EO 1 mol | RmGly EO 10 mol | RmGly EO 30 mol | 0.50 | 0.50 | 0.5 | F-1 | 0.30 |
| 19 | RmSb | RmEO 5 mol | RmEO 20 mol | 0.50 | 0.50 | 0.5 | F-1 | 0.30 |
| 20 | RmSb | RmEO 20 mol | RmEO 50 mol | 0.50 | 0.50 | 0.5 | F-1 | 0.30 |
| 21 | RmSb | RmEO 5 mol | RmEO 20 mol | 0.50 | 0.50 | 0.5 | F-2 | 0.30 |
| 22 | RmGly | RmEO 5 mol | RmEO 20 mol | 0.50 | 0.50 | 0.5 | F-1 | 0.30 |
| 23 | RmGly | RmEO 20 mol | RmEO 50 mol | 0.50 | 0.50 | 0.5 | F-1 | 0.30 |
| 24 | RmGly | RmEO 5 mol | RmEO 20 mol | 0.50 | 0.50 | 0.5 | F-2 | 0.30 |
| 25 | RmSb EO 5 mol | RmSb EO 10 mol | RmSb EO 20 mol | 0.10 | 0.10 | 0.1 | F-1 | 0.30 |
| 26 | RmSb EO 5 mol | RmSb EO 10 mol | RmSb EO 20 mol | 1.00 | 1.00 | 1.0 | F-1 | 0.30 |
| 27 | RmSb EO 5 mol | RmSb EO 10 mol | RmSb EO 20 mol | 0.50 | 0.50 | 0.5 | F-1 | 0.05 |
| 28 | RmSb EO 5 mol | RmSb EO 10 mol | RmSb EO 20 mol | 0.50 | 0.50 | 0.5 | F-1 | 2.00 |
| 29 | RmSb EO 5 mol | RmSb EO 10 mol | RmSb EO 20 mol | 0.50 | 0.50 | 0.5 | F-3 | 0.30 |
| 30 | RmSb EO 5 mol | RmSb EO 10 mol | SlSb EO$_n$ | 0.50 | 0.50 | 0.5 | F-1 | 0.30 |
| 31 | RmSb EO 5 mol | RmSb EO 10 mol | LaSb EO$_n$ | 0.50 | 0.50 | 0.5 | F-1 | 0.30 |
| 32 | Rm2Sb EO 5 mol | Rm2Sb EO 10 mol | Rm2Sb EO 20 mol | 0.50 | 0.50 | 0.5 | F-1 | 0.30 |
| 33 | Rm3Sb EO 5 mol | Rm3Sb EO 10 mol | Rm3Sb EO 20 mol | 0.50 | 0.50 | 0.5 | F-1 | 0.30 |
| 34 | Rm2Gly EO 5 mol | Rm2Gly EO 10 mol | Rm2Gly EO 20 mol | 0.50 | 0.50 | 0.5 | F-1 | 0.30 |
| 35 | Rm3Gly | — | — | 1.50 | 0 | 0 | F-1 | 0.30 |
| 36 | RmSb | — | — | 1.50 | 0 | 0 | F-1 | 0.30 |
| 37 | RmGly | — | — | 1.50 | 0 | 0 | F-1 | 0.30 |

TABLE 2

| Example No. | initial stage anti-clouding property | initial stage anti-fogging property | 45 days accelerated test on 60° C. anti-clouding property | 45 days accelerated test on 60° C. anti-fogging property | 90 days accelerated test on 60° C. anti-clouding property | 90 days accelerated test on 60° C. anti-fogging property |
|---|---|---|---|---|---|---|
| 1 | △ | ⊚ | ○ | ⊚ | ○ | ⊚ |
| 2 | △ | ⊚ | ○ | ⊚ | ○ | ⊚ |
| 3 | ⊚ | ⊚ | ⊚/○ | ⊚ | △ | ⊚ |
| 4 | △ | ⊚ | ○ | ⊚ | ○ | ⊚ |
| 5 | △ | ⊚ | ○ | ⊚ | △ | ⊚ |
| 6 | ⊚/○ | ⊚ | ⊚/○ | ⊚ | ○ | ⊚ |
| 7 | ⊚/○ | ⊚ | ⊚ | ⊚ | ○ | ⊚ |
| 8 | ⊚ | ⊚ | ○ | ⊚ | ○ | ⊚ |
| 9 | ⊚ | ⊚ | ○ | ⊚ | ○ | ⊚ |
| 10 | △ | ⊚ | ○ | ⊚ | ○ | ⊚ |
| 11 | △ | ⊚ | ○ | ⊚ | ○ | ⊚ |
| 12 | ○ | ⊚ | ○ | ⊚ | △ | ⊚ |
| 13 | △ | ⊚ | ○ | ⊚ | ○ | ⊚ |
| 14 | △ | ⊚ | ○ | ⊚ | △ | ⊚ |
| 15 | ⊚/○ | ⊚ | ○ | ⊚ | △ | ⊚ |
| 16 | ⊚/○ | ⊚ | ⊚/○ | ⊚ | ○ | ⊚ |
| 17 | ⊚ | ⊚ | ○ | ⊚ | △ | ⊚ |
| 18 | ⊚ | ⊚ | ○ | ⊚ | △ | ⊚ |
| 19 | ○ | ⊚ | ○ | ⊚ | ○ | ⊚ |
| 20 | ⊚ | ⊚ | ○ | ⊚ | △ | ⊚ |
| 21 | ○ | ⊚ | ○ | ⊚ | ○ | ⊚ |
| 22 | ○ | ⊚ | ○ | ⊚ | ○ | ⊚ |

TABLE 2-continued

| | initial stage | | 45 days accelerated test on 60° C. | | 90 days accelerated test on 60° C. | |
|---|---|---|---|---|---|---|
| Example No. | anti-clouding property | anti-fogging property | anti-clouding property | anti-fogging property | anti-clouding property | anti-fogging property |
| 23 | ⊚ | ⊚ | ○ | ⊚ | △ | ⊚ |
| 24 | ○ | ⊚ | ○ | ⊚ | ○ | ⊚ |
| 25 | ○ | ⊚ | ○ | ⊚ | △ | ⊚ |
| 26 | ⊚ | ⊚ | ⊚ | ⊚ | ⊚ | ⊚ |
| 27 | ⊚/○ | ○ | ⊚ | △ | ⊚ | △ |
| 28 | ⊚/○ | ⊚ | ⊚ | ⊚ | ⊚ | ⊚ |
| 29 | ⊚/○ | ⊚ | ⊚ | ⊚ | ⊚ | ⊚ |
| 30 | ⊚/○ | ⊚ | ⊚ | ⊚ | ⊚ | ⊚ |
| 31 | ⊚/○ | ⊚ | ⊚ | ⊚ | ⊚ | ⊚ |
| 32 | ⊚/○ | ⊚ | ⊚ | ⊚ | ⊚ | ⊚ |
| 33 | ⊚/○ | ⊚ | ○ | ⊚ | ⊚ | ⊚ |
| 34 | ⊚/○ | ⊚ | ⊚/○ | ⊚ | ⊚ | ⊚ |
| 35 | △ | ⊚ | △ | ⊚ | △ | ⊚ |
| 36 | △ | ⊚ | △ | ⊚ | △ | ⊚ |
| 37 | △ | ⊚ | △ | ⊚ | △ | ⊚ |

COMPARATIVE EXAMPLES 1 to 6

Synthetic resin films were prepared in the same manner as in Example 1 except that 1.5 parts by weight of the adduct of sorbitan monomontanate with 5 mols of ethylene oxide and 0.3 part by weight of the adduct of perfluoroethanol ($RfCH_2CH_2OH$; $Rf=C_{6-12}$) with ethylene oxide used in Example 1 were replaced by the compounds described in the column of component (a) and component (b) in Table 3 in amounts also described in Table 3. Evaluation of the film was conducted according to the same accelerated test method and observation and evaluation method of anti-clouding property and anti-fogging property as in Example 1 to obtain the results shown in Table 4.

Additionally, in the column of component (a) in Table 3, "StSb" represents sorbitan monostearate, "StSb EO 1 mol", "StSb EO 5 mols", "StSb EO 10 mols", "StSb EO 20 mols", and "StSb EO 50 mols" each represents an adduct of sorbitan monostearate with 1 mol, 5 mols, 10 mols, 20 mols, 30 mols or 50 mols of ethylene oxide, "StGly" represents glycerin monostearate, "StGly EO 5 mols", "StGly EO 10 mols", "StGly EO 20 mols" and "StGly EO 50 mols" each represents an adduct of glycerin monostearate with 1 mol, 5 mols, 10 mols, 20 mols, 30 mols or 50 mols of ethylene oxide.

COMPARATIVE EXAMPLE 7

A synthetic resin film was prepared in the same manner as in Example 1 except for using, as component (a), each 0.5 part by weight of adducts of sorbitan monomontanate respectively with 5 mols, 10 mols and 20 mols of ethylene oxide (1.5 parts by weight in total) and not using fluorine-containing surfactants. Evaluation of the film was conducted according to the same accelerated test method and observation and evaluation method of anti-clouding property and anti-fogging property as in Example 1 to obtain the results shown in Table 4.

COMPARATIVE EXAMPLE 8

A synthetic resin film was prepared in the same manner as in Example 1 except for using 0.3 part by weight of F-1 as a fluorine-containing surfactant and not using component (a). Evaluation of the film was conducted according to the same accelerated test method and observation and evaluation method of anti-clouding property and anti-fogging property as in Example 1 to obtain the results shown in Table 4.

TABLE 3

| Comparative | component (a) | | | additive amount (phr) | | | component (b) fluorine-containing SAA | additive amount (phr) |
|---|---|---|---|---|---|---|---|---|
| Example No. | first component | second component | third component | first component | second component | third component | | |
| 1 | StSb EO 5 mol | StSb EO 10 mol | StSb EO 20 mol | 0.5 | 0.5 | 0.5 | F-1 | 0.3 |
| 2 | StSb EO 1 mol | StSb EO 20 mol | StSb EO 50 mol | 0.5 | 0.5 | 0.5 | F-1 | 0.3 |
| 3 | StSb | StSb EO 5 mol | StSb EO 20 mol | 0.5 | 0.5 | 0.5 | F-1 | 0.3 |
| 4 | StSb | StSb EO 20 mol | StSb EO 50 mol | 0.5 | 0.5 | 0.5 | F-1 | 0.3 |
| 5 | StGly | StGly EO 5 mol | StGly EO 20 mol | 0.5 | 0.5 | 0.5 | F-1 | 0.3 |
| 6 | StGly | StGly EO 20 mol | StGly EO 50 mol | 0.5 | 0.5 | 0.5 | F-1 | 0.3 |
| 7 | RmSb EO 5 mol | RmSb EO 10 mol | RmSb EO 20 mol | 0.5 | 0.5 | 0.5 | — | 0 |
| 8 | — | — | — | 0 | 0 | 0 | F-1 | 0.3 |

TABLE 4

| Comparative Example No. | initial stage | | 45 days accelerated test on 60° C. | | 90 days accelerated test on 60° C. | |
|---|---|---|---|---|---|---|
| | anti-clouding property | anti-fogging property | anti-clouding property | anti-fogging property | anti-clouding property | anti-fogging property |
| 1 | ◎ | ○ | △ | ○ | X | ○ |
| 2 | ◎ | ○ | △ | ○ | △ | ○ |
| 3 | ○ | ○ | △ | ○ | X | ○ |
| 4 | ○ | ○ | △ | ○ | △ | ○ |
| 5 | ○ | ○ | △ | ○ | X | ○ |
| 6 | ○ | ○ | △ | ○ | △ | ○ |
| 7 | ◎/○ | X | ○ | X | △ | X |
| 8 | X | △ | X | △ | X | △ |

Advantages of the Invention

As has been described hereinbefore, according to the present invention, a synthetic resin film for agriculture suited as agricultural covering material for greenhouses or the like can be obtained, which exhibits good anti-clouding and anti-fogging properties from the initial stage of being spread, with the good properties lasting for a long period of time.

Industrial utility

As has been described hereinbefore, the synthetic resin film for agriculture in accordance with the present invention is useful as an agricultural covering material for greenhouses or the like.

What is claimed is:

1. An agricultural cover synthetic resin film comprising an anticlouding/antifogging agent, said anticlouding/antifogging agent including:
   (a) at least one compound selected from the group consisting of (1) an ester of sorbitan with montanic acid wax containing 24 to 34 carbon atoms, (2) an ester of glycerin with montanic acid wax containing 24 to 34 carbon atoms, (3) an alkylene oxide adduct to the ester of sorbitan with montanic acid wax containing 24 to 34 carbon atoms, (4) an alkylene oxide adduct to the ester of glycerin with montanic acid wax containing 24 to 34 carbon atoms, and (5) an ester of polyoxyalkylene with montanic acid wax containing 24 to 34 carbon atoms; and
   (b) a fluorine-containing surfactant.

2. An agricultural cover synthetic resin film comprising an anticlouding/antifogging agent, said anticlouding/antifogging agent including:
   (a) at least one compound selected from the group consisting of (1) an ester of sorbitan with montanic acid wax containing 24 to 34 carbon atoms, (2) an ester of glycerin with montanic acid wax containing 24 to 34 carbon atoms, (3) an alkylene oxide adduct to the ester of sorbitan with montanic acid wax containing 24 to 34 carbon atoms, (4) an alkylene oxide adduct to the ester of glycerin with montanic acid wax containing 24 to 34 carbon atoms, and (5) an ester of polyoxyalkylene with montanic acid wax containing 24 to 34 carbon atoms;
   (b) a fluorine-containing surfactant; and
   (c) at least one compound selected from the group consisting of an ester of sorbitan with higher fatty acid containing 12 to 22 carbon atoms, an ester of glycerin with higher fatty acid containing 12 to 22 carbon atoms, and alkylene oxide adducts thereto.

3. The agricultural cover synthetic resin film as described in claim 1, wherein said synthetic resin film is a vinyl chloride resin or a polyolefin resin.

4. The agricultural cover synthetic resin film as described in claim 2, wherein said synthetic resin film is a vinyl chloride resin or a polyolefin resins.

5. A synthetic resin film for agriculture comprising:
   (a) at least one compound selected from the group consisting of (1) an alkylene oxide adduct to the ester of sorbitan with montanic acid wax containing 24 to 34 carbon atoms, (2) an alkylene oxide adduct to the ester of glycerin with montanic acid wax containing 24 to 34 carbon atoms, and (3) an ester of polyoxyalkylene with montanic acid wax containing 24 to 34 carbon atoms; and
   (b) a fluorine-containing surfactant.

6. The synthetic resin film as described in claim 5, further comprising (c) at least one compound selected from the group consisting of an ester of sorbitan with higher fatty acid containing 12 to 22 carbon atoms, an ester of glycerin with higher fatty acid containing 12 to 22 carbon atoms, and alkylene oxide adducts thereto.

7. The synthetic resin film as described in claim 5, wherein said synthetic resin film is a vinyl chloride resin or a polyolefin resin.

* * * * *